March 6, 1928.  
J. SZYDLOWSKI  
PISTON ENGINE  
Filed April 24, 1926  
1,661,582  
5 Sheets-Sheet 1

Inventor  
Josef Szydlowski.

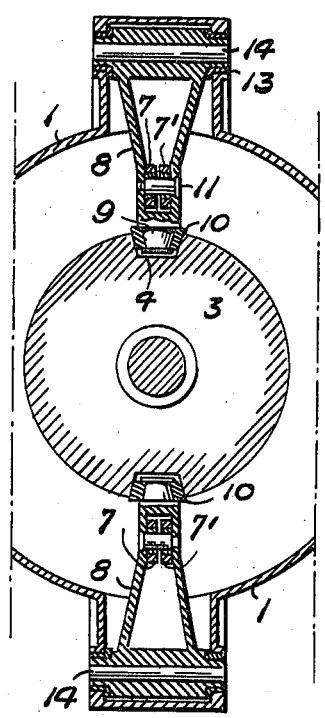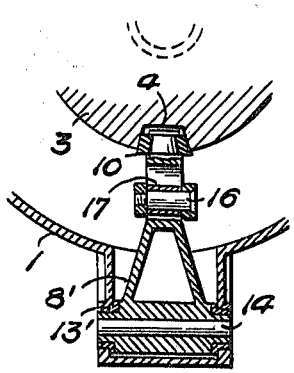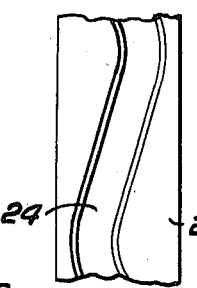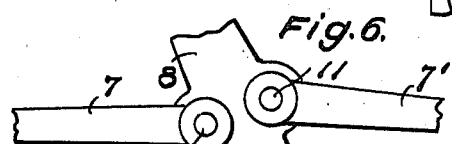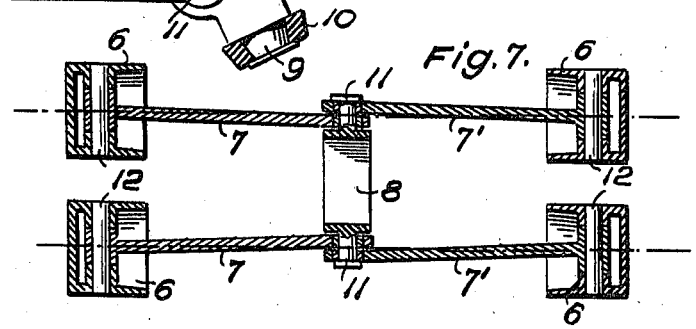

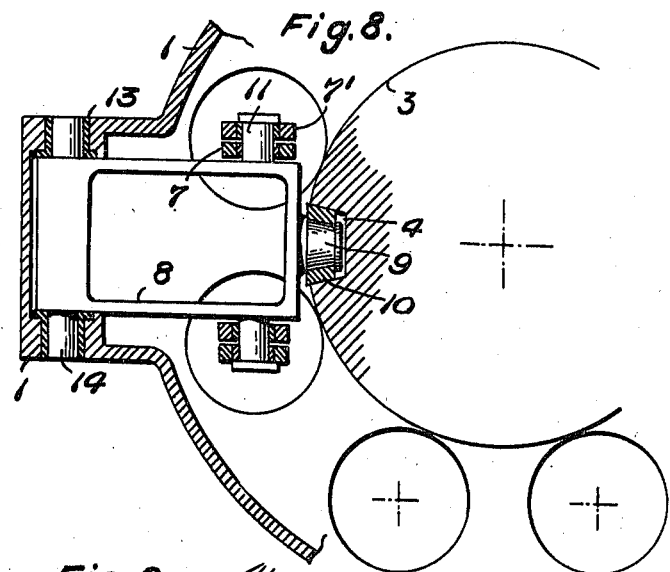
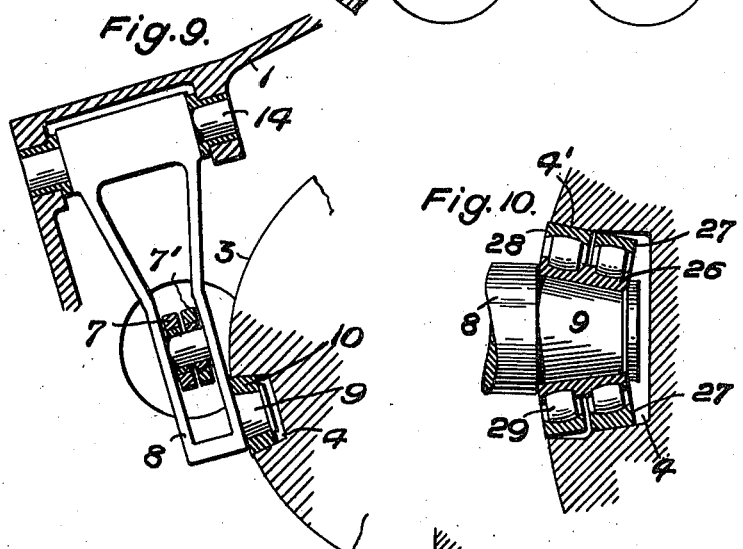
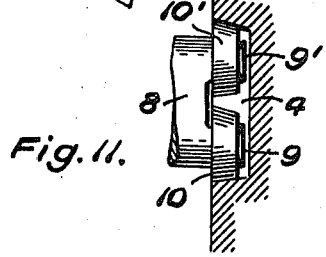

March 6, 1928.

J. SZYDLOWSKI 1,661,582

PISTON ENGINE

Filed April 24, 1926   5 Sheets-Sheet 4

March 6, 1928.  1,661,582

J. SZYDLOWSKI

PISTON ENGINE

Filed April 24, 1926  5 Sheets-Sheet 5

Inventor
Josef Szydlowski
By Knight Bros
Attys

Patented Mar. 6, 1928.

1,661,582

UNITED STATES PATENT OFFICE.

JOSEF SZYDLOWSKI, OF BADEN, GERMANY.

PISTON ENGINE.

Application filed April 24, 1926, Serial No. 104,395, and in Germany June 23, 1925.

This invention relates to piston engines such as steam engines, combustion engines and the like and its principal object is to provide a piston engine of this class, of novel and improved construction.

More specially the invention relates to piston engines in which the cylinders are lying in such a position in relation to the driving shaft that latter can not be operated by means of the usual piston rod and crank connection.

Piston engines, in which the cylinders are lying parallelly to the driving shaft, are known. In such engines the transmission of the piston motion to the driving shaft is effected by means of a closed slot in a transmission drum or by means of a wedge, which slot or wedge cooperates with the piston rod by means of one or more cams arranged on the latter. In engines of the above mentioned kind it is also known to arrange two cylinders on opposite sides of the slotted drum, whereby the pistons in the said cylinders by means of a common piston rod, cams or the like transmit the piston motion to the slotted drum. The characteristic feature of such engines is, that the cams, rolls or the like, which cooperate with the drum, must perform the same parallel motion as the piston, because they are rigidly connected to the same through the piston rod. On account of this direct coupling the peripheral force transmitted to the slotted drum must be taken up by the piston or by a guide in which the piston rod is sliding, as a reaction force. If now the cam is equipped with a conical roll a radial force will be added to the said force which is tangentially directed to the drum. These forces are active over the entire length of the piston stroke and will cause considerable friction losses. Moreover, it is very difficult to construct such engines in such a manner that a satisfactory operation of the same is ensured.

According to the present invention the mentioned drawbacks are eliminated by coupling the piston to the slotted drum by means of an oscillating lever, which is equipped with cams and with a roller. As will be set forth below, this lever takes up the reaction forces and because its motion is only a small one and the sliding friction easily may be replaced by a rolling friction the mechanical losses are very low.

Some preferred constructional forms of the invention are shown by way of examples in the accompanying drawings.

Fig. 3 is a section on the line 3—3 of Fig. 1.

Fig. 4 is a section on the line 4—4 of Fig. 2.

Figure 5 is a detail showing a part of the guide slot in the transmission drum.

Figure 6 shows a special form of the part of the oscillating lever to which the connecting rods are fastened.

Figure 7 is a partial sectional view of a multi-cylinder engine having four cylinders which are lying side by side on each side of the engine.

Figure 8 is another partial sectional view through the same engine.

The Figures 9, 10 and 11 are detail views showing different arrangements for coupling the oscillating levers to the trnasmission drum.

Figure 12:
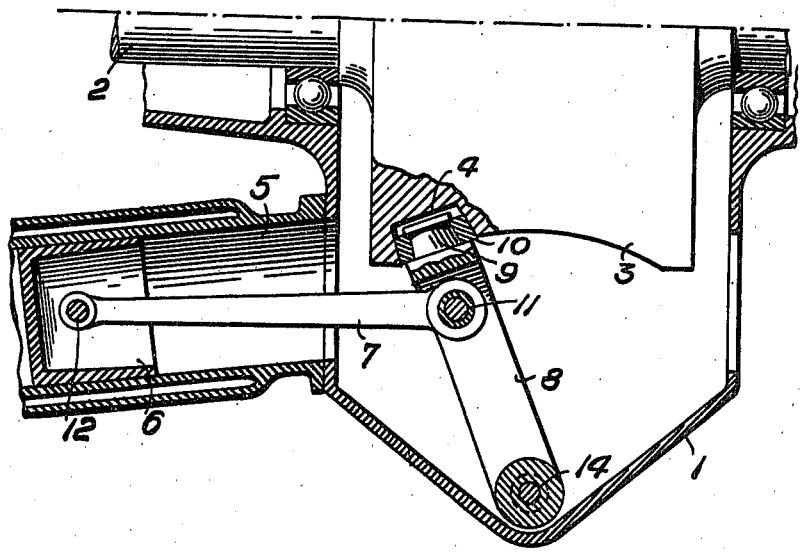

Figure 12 shows an engine in which the cylinders are not lying parallel to the driving shaft.

Figure 13:
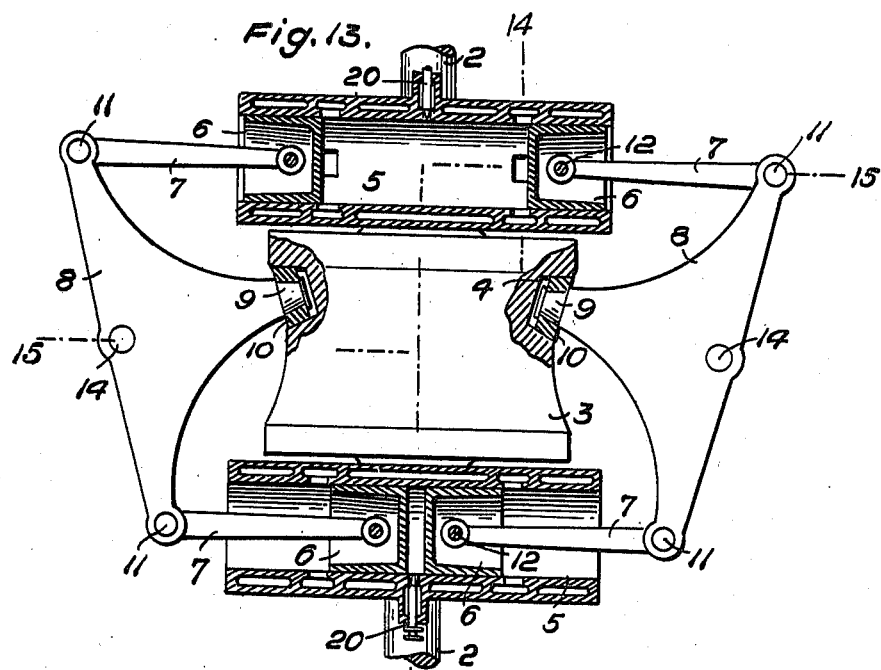

Figure 13 is a partial view through a multi-cylinder two-cycle combustion engine.

Figure 14:
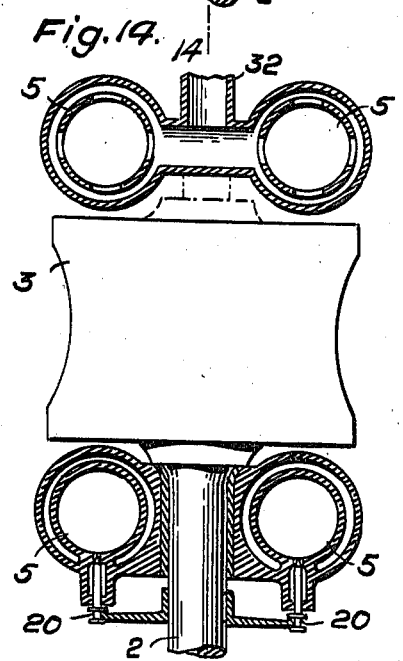

Figure 14 is a transverse section on the line 14—14 of Figure 13 and

Figure 15:
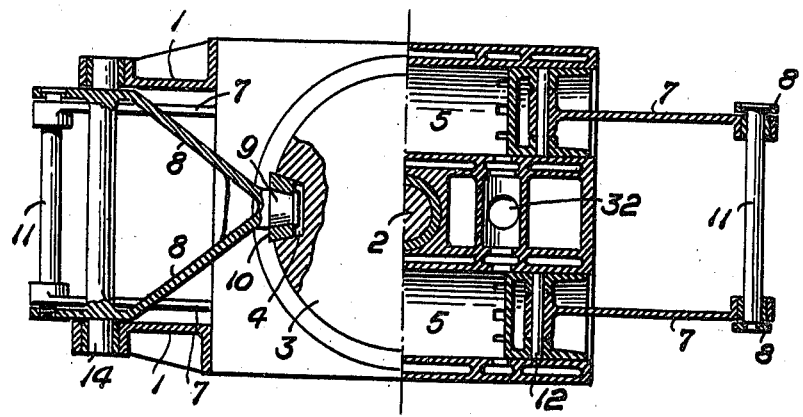

Figure 15 is a transverse section on the line 15—15 of Figure 13.

Figure 1:
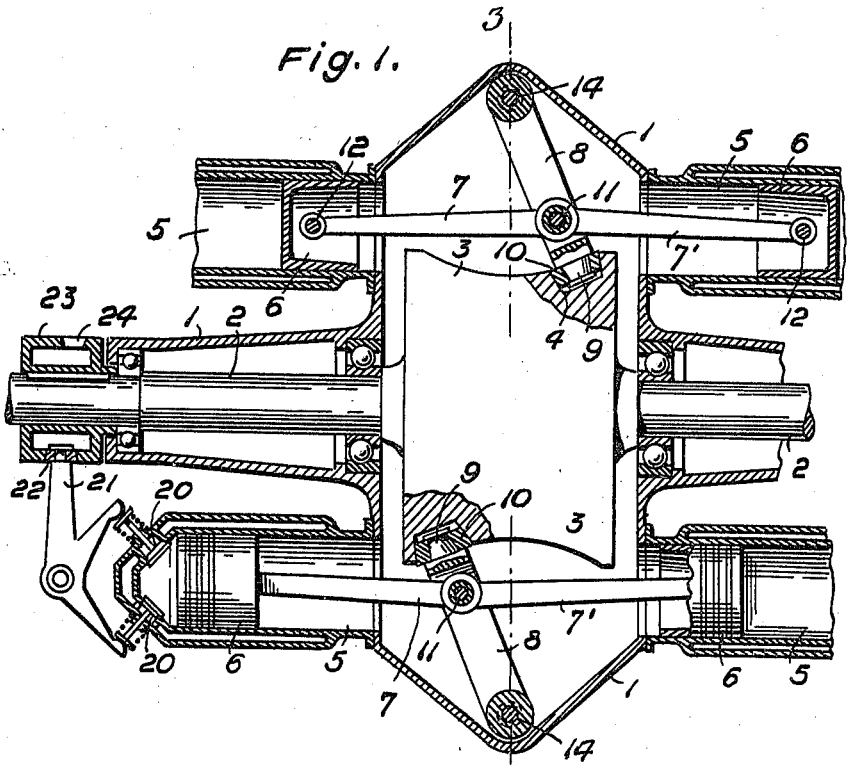
Figure 1 is a longitudinal sectional view of a multi-cylinder engine in accordance with the invention.
Figure 2:
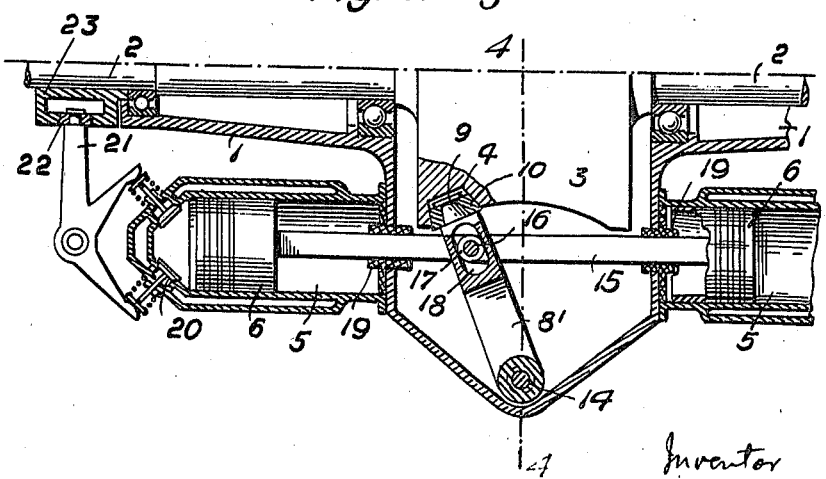
Figure 2 is a similar view of a somewhat modified constructional form of the invention.

Referring now particularly to the Figures 1 and 2 the driving shaft 2 is located in the closed casing 1. To the driving shaft the concave slot drum 3 is fixed, which in its surface is equipped with a closed slot. On the outer face of the casing 1 the cylinders 5 are arranged, in which the pistons 6 are sliding. The pistons 6 are connected by means of the pins 12 to the connecting rods 7 and 7¹ respectively. The connecting rods are linkedly connected to the oscillating lever 8 by means of the pin 11 (see also Figure 3). The lever 8 is rotatably arranged on its pin shaft 14 which is located in the bearing 13. At the end of the lever a pin 9 supports a roller 10. Instead of the roller 10 a ball or roller bearing may be arranged. The same also relates to all other pins which in the drawing are shown in sliding bearings for the sake of simplicity. Instead of arranging the cylinders on both sides of the drum all cylinders may be arranged on the same side of the drum. The oscillating piston motion (see Figure 1) creates a rotating movement of the slot drum 3 by means of the piston pin 12, the connecting rod 7, the oscillating lever 8, the pin 9 and the roller 10. The connection between the connecting rod 7 and the lever 8 may also be formed as shown in Figure 6.

According to the constructional form shown in Figure 2 the oppositely arranged pistons are rigidly connected by means of a rod 15. The motion of this rod is transmitted by means of the pin 16 and the roller 17 to the guide 18 of the oscillating lever $8^I$.

The guides 19 serve for relieving the pistons from lateral pressures. In this case the cylinders preferably are centered on the same. The guides 18 may also be dispensed with.

Instead of arranging the oscillating levers 8 radially, as shown in Figures 1-4 the same may be arranged under any desired angle as shown in Figure 9.

The Figures 7 and 8 show a multi-cylinder engine having on each side four cylinders are lying side by side and which operate an oscillating lever 8. The pistons are coupled to the oscillating lever by means of connecting rods 7 and $7^I$, but it would also be possible to employ two piston rods 15, as shown in Figure 2. In the engine shown in Figure 8 eight cylinders are arranged on each side. The slot in the drum consists of four branches, so that the diametrically opposed oscillating levers run in the same direction, whereby a complete balancing of the masses is obtained.

A satisfactory cooperation between the member 9 and the slot 4 is obtained by inserting an automatically self adjusting bearing, e. g. a so called barrel bearing or the like.

When using a single roller 10 or a corresponding bearing according to the Figures 1, 3, 8 and 9, this must alter its direction of rotation, according as it operates on the upper or the lower wall of the slot. In the arrangement shown in Figure 10 this difficulty is removed. On the common inner ring 26 of the bearing two rows of barrels 29 (which may be rollers or balls) are arranged independently of each other. Also two outer rings 27 and 28 are arranged. The slot 4 is formed in such a manner that each outer ring only can work on one slot wall. If for instance the ring 28 works on the slot wall $4^I$, the ring 27 works on the wall 4. Hereby a change of the direction of rotation is avoided.

Figure 11 shows another constructional form, according to which both rollers 10 and $10^I$ work on two pins 9 and $9^I$.

For controlling the valves 20 a guide drum 23 is arranged on the shaft 2. This drum is equipped with a slot 24 which by means of the roller 22 is coupled to the lever 21. The lever 21 thus simultaneously controls the inlet- and the outlet-valves.

If the cylinders are not lying parallel to the driving shaft, but are taking up any other position in relation to this, the arrangement is somewhat different from the arrangements described above.

According to Figure 12 the cylinders 5 are not parallel to the driving shaft. In this case the arrangement differentiates but very little from the engine shown in Figure 1. Also in this constructional form a plurality of cylinders may be arranged side by side on one side, respectively on both sides of the drum 3 and the piston rods 7 of these cylinders may operate the same lever 8. The lever 8 may also be located tangentially to the drum, as in Fig. 9 (instead of radially as shown in Figure 12.)

Figure 13 is a longitudinal section through a two-cycle combustion engine the pistons of which are moving in opposite directions. The cylinders 5 are arranged on both sides of the slotted drum 3 transversely to the axis of the shaft 2. The engine consists of two groups of cylinders, whereby each group consists of two double cylinders and of four pistons. Each group is equipped with a bearing in which driving shaft 2 is supported. In the drawing this bearing is shown integral with the cylinder frame, but it may of course also be arranged as a separate element. The coupling between the piston and the driving shaft 2 is effected by means of the piston pin 12 the connecting rod 7, the pin 11, the double rocking or oscillating lever 8, which oscillates on the pin shaft 14 and which is equipped with a pin 9 and a cam roller 10 and the slotted drum 3. Four pistons 6 are working on each oscillating lever 8.

Figure 15 is a section on the line 15—15 of Figure 13. The lever 8 is arranged by means of the pin shaft 14 on the frame 1 and is equipped with a pin or bolt 11. The valves 20 of the cylinder are arranged on the outside of the same in such a manner, that they may be controlled directly from the driving shaft 2 or in known manner by means of a lever arrangement.

Figure 14 is a sectional view on the line 14—14 in Figure 13. Each group of cylinders is equipped with common outlet- and inlet-openings 32 for the cylinders which are arranged above each other. The lever 8 is arranged radially to the slotted drum, but may of course also be arranged tangentially to the same. Instead of arranging four pistons for each oscillating lever only two pistons may be connected to the lever. It is also possible to arrange more of the devices shown in Figure 13 behind each other, so that any desired number of cylinders may operate the common driving shaft 2. In such case a slotted drum 3 is provided for each group.

It will be apparent that various other changes may be made in the form, construction and arrangement of the parts without departing from the scope of my invention sacrificing any of the material advantages thereof and I reserve the right to make all such changes as fairly fall within the scope of the following claims.

I claim:

1. In a piston engine, an engine frame, cylinders arranged adjacent to said frame, pistons operating in said cylinders, a driven shaft, said cylinders arranged in any position relative to said driven shaft, a rocking lever, means connecting said pistons to said rocking lever, a drum operatively connected to said driven shaft, a cam on said drum, and means on said rocking lever cooperating with said cam for imparting motion to said shaft.

2. In a piston engine, an engine frame, cylinders arranged adjacent to said engine frame, pistons operating in said cylinders, a driven shaft, said cylinders arranged in any position relative to said driven shaft, a rocking lever, means for pivotally connecting said rocking lever to said engine frame, means for connecting said pistons to said rocking lever, a drum operatively connected to said driven shaft, a cam on said drum, and means on said rocking lever cooperating with said cam for imparting motion to said shaft.

3. In a piston engine, an engine frame, cylinders arranged adjacent to said engine frame, pistons operating in said cylinders, a driven shaft, said cylinders arranged in any position relative to said driven shaft, a rocking lever, means for pivotally connecting said rocking lever to said engine frame, means for connecting said pistons to said rocking lever, a drum rigidly connected to said driven shaft, a cam on said drum, a roller on said rocking lever, and anti-frictional devices arranged between said roller and said cam providing a rolling friction between the same.

4. In a piston engine, an engine frame, cylinders arranged adjacent to said engine frame, pistons operating in said cylinders, a driven shaft, said cylinders arranged in any position relative to said driven shaft, a rocking lever, means for pivotally connecting said rocking lever to said engine frame, a drum rigidly connected to said driven shaft, a cam on said drum, means on said rocking lever cooperating with said cam, and means connecting said pistons to said rocking lever at a point intermediate the pivot of said rocking lever and said means cooperating with said cam.

5. In a piston engine, an engine frame, a cylinder arranged adjacent to said engine frame, a piston operating in said cylinder, a driven shaft, a rocking lever, means for pivotally connecting said rocking lever to said engine frame, a drum operatively connected to said driven shaft, a cam on said drum, means for connecting said piston to said rocking lever, and a pair of roller devices on said rocking lever cooperating with opposite sides of said cam for imparting motion to said shaft.

The foregoing specification signed at Baden-Baden February, 1926.

JOSEF SZYDLOWSKI.